Figure 1:
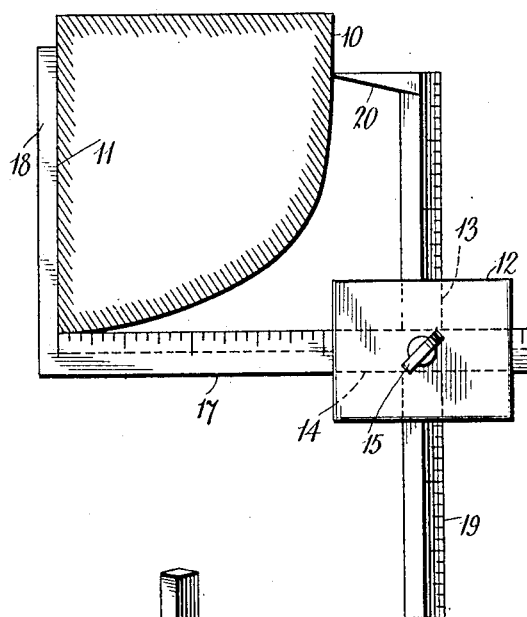

F. R. TORESON.
BOAT DRAFTING DEVICE.
APPLICATION FILED MAY 22, 1908.

906,581.

Patented Dec. 15, 1908.

Witnesses

Inventor
F. R. Toreson
By
Attorneys

UNITED STATES PATENT OFFICE.

FRED R. TORESON, OF GLEN ARBOR, MICHIGAN.

BOAT-DRAFTING DEVICE.

No. 906,581. Specification of Letters Patent. Patented Dec. 15, 1908.

Application filed May 22, 1908. Serial No. 434,341.

*To all whom it may concern:*

Be it known that I, FRED R. TORESON, a citizen of the United States, residing at Glen Arbor, in the county of Leelanau, State of Michigan, have invented certain new and useful Improvements in Boat-Drafting Devices; and I do hereby declare the following to be a full, clear, and exact description of the invention, such as will enable others skilled in the art to which it appertains to make and use the same.

This invention relates to devices employed in drafting boats and for similar purposes, and has for one of its objects to simplify and improve devices of this character.

Another object of the invention is to provide a simply constructed instrument whereby the various dimensions of the hull of a boat may be accurately determined from a small model and without the necessity for constructing the model of thin separable "streaks" in the ordinary manner.

In constructing ships, vessels and boats of various kinds, a model of one half of the hull is first made to a scale and built up of thin sheets of wood preferably in two colors and of predetermined thickness, generally corresponding to the scale of the hull, so that each sheet of the wood represents a certain vertical dimension, generally one foot, hence when the sheets are separated, their upper surfaces represent the outline of one half of the vessel's hull at the elevation corresponding to its location in the model, and by measuring this sheet, the width of the hull can be ascertained. But this method requires time and skill first to construct the model from the layers of wood and second to apply a scale rule to the various sheets and calculating the required dimensions therefrom.

The improved device comprises two parts, first a model constructed from any suitable material, preferably soft wood and in one single piece or in pieces glued or otherwise immovably connected, and without regard to thickness as the streaks or layers of predetermined thickness are not required, as in models heretofore constructed. The model is constructed otherwise in the same manner as the separable models above noted and with the inner face of the model representing the perpendicular center line of the hull.

The second part of the improved device comprises a block having two apertures at right angles to each other, one aperture to receive a graduated rod having a right angled extension for bearing against the rear or "center-line" face of the model, and the other aperture to receive another graduated bar having a lateral pointer at one end to bear against the outer face of the model, the graduated bars being adjustable in the block. By this simple means the width of the model at various points in its elevation may be accurately determined.

Figure 2:
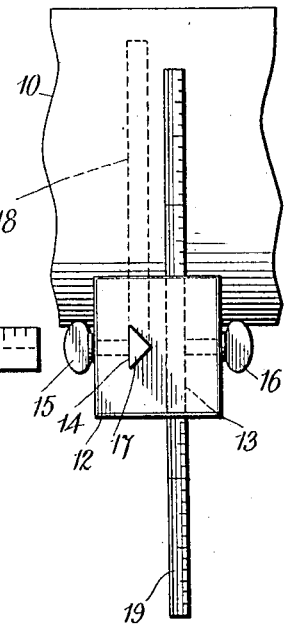
Figure 3:
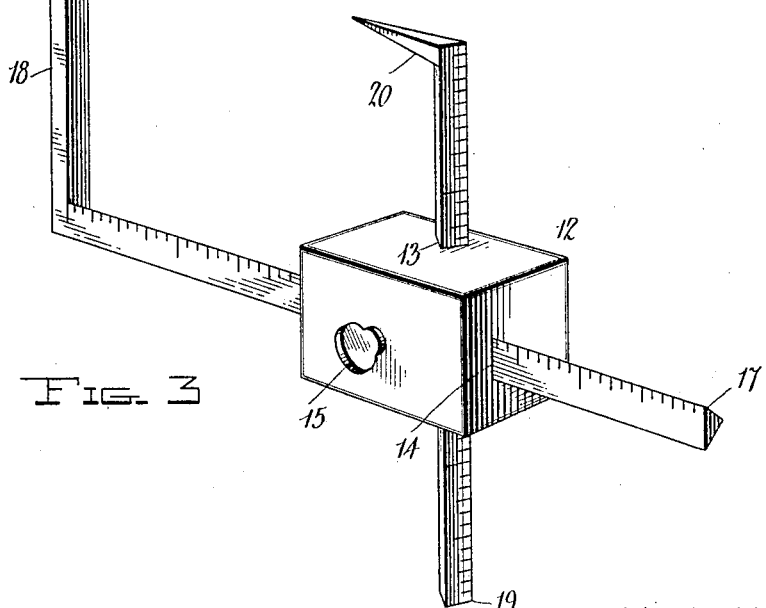

In the drawings illustrative of the embodiment of the invention, Figure 1 is a side view of the improved implement with the model in transverse section. Fig. 2 is a front view of the same. Fig. 3 is a perspective view of the improved implement.

The model portion of the improved device is represented in part at 10, and formed with one face 11 representing the vertical and longitudinal center of the vessel. The measuring portion of the improved device comprises a block 12 having apertures 13—14 extending therethrough at right angles to each other. A graduated bar 17 is slidably disposed in the aperture 14 and formed with a right angled extension 18, and slidably disposed in the aperture 13 is a graduated bar 19 having a lateral pointer 20 at one end. Threaded apertures are formed in the block 10 and communicate with the bar receiving apertures and in which set screws 15—16 are arranged to bear against the graduated bars and thus clamp them in the block at predetermined points. The graduations on the bars 17—19 are preferably in twelfths of an inch, and fractions thereof, and the model is likewise preferably made on the same scale, but these scales may be varied if preferred, but it is obvious that the scale of the model and those upon the bars must correspond. With an implement thus constructed it is obvious that by so disposing the block 10 that the extension 18 of the bar 17 rests against the face 11 of the model with the bar 17 against the bottom of the model, and adjusting the block 10 upon the bar 17 and the bar 19 in the block until the pointer 20 touches the model, (it being understood that the end of the pointer is at all times in alinement with the face of the block next to the projection 18,) the width of the model at the point where the pointer touches it will be indicated by the scale on the bar 17 and the distance above the bottom of the model will be indicated by the scale on the bar 19, and by a simple calculation the dimension of the full sized hull at the corresponding point may be readily ascertained, and by repeating the operation over the whole surface of the model, the corresponding dimensions on the full sized hull may be readily ascertained, as will be obvious.

The apertures through the blocks and the transverse sections of the bars 17—19 correspond and are preferably triangular, as shown, so that the bars cannot rotate in the block, while the extension 18 is preferably square, or with a flat inner face to bear upon the face 11 of the model.

The block and the graduated bars are of metal, and may be of any required size, and in any suitable proportions.

The improved device, as above stated, is more particularly applicable to the measurement of models for vessels, but it will be obvious that the improved device may likewise be employed for models of other character, and is equally adapted for any model having one straight side, and the invention is not necessarily limited therefore to employment in the construction of the hulls of vessels, and may be employed without departing from the principle of the invention for any purpose for which it is adapted, within the scope of the appended claim.

What is claimed, is:—

A device of the class described comprising a block having right angled faces and with apertures extending therethrough at right angles to each other and in parallel relations to said faces, a graduated bar slidable through one of said apertures and provided with a laterally extending pointer with its terminal in constant alinement with one of the faces of the block, and a graduated arm extending through the other of said apertures and provided with a right angled extension and means for independently clamping said bars within said block.

In testimony whereof, I affix my signature, in presence of two witnesses.

FRED R. TORESON.

Witnesses:
MARY ETTA FISHER,
CHARLES A. FISHER.